United States Patent
Penland, Jr. et al.

(10) Patent No.: US 9,486,976 B1
(45) Date of Patent: Nov. 8, 2016

(54) MAT CONSTRUCTION HAVING ENVIRONMENTALLY RESISTANT SKIN

(71) Applicant: QUALITY MAT COMPANY, Beaumont, TX (US)

(72) Inventors: Joe Penland, Jr., Beaumont, TX (US); Rustin Penland, Beaumont, TX (US); Scott Calvert, Beaumont, TX (US); Thomas O'Brien, Wanaka (NZ)

(73) Assignee: Quality Mat Company, Beaumont, TX (US)

( * ) Notice: Subject to any disclaimer, the term of this patent is extended or adjusted under 35 U.S.C. 154(b) by 0 days.

(21) Appl. No.: 14/855,336

(22) Filed: Sep. 15, 2015

(51) Int. Cl.
| | |
|---|---|
| *E01C 5/22* | (2006.01) |
| *E01C 5/14* | (2006.01) |
| *E01C 5/20* | (2006.01) |
| *E01C 9/08* | (2006.01) |
| *B32B 3/18* | (2006.01) |

(Continued)

(52) U.S. Cl.
CPC ............. *B32B 3/18* (2013.01); *B32B 3/266* (2013.01); *B32B 15/095* (2013.01); *B32B 21/045* (2013.01); *B32B 21/12* (2013.01); *B32B 27/08* (2013.01); *E01C 5/14* (2013.01); *E01C 5/20* (2013.01); *E01C 5/22* (2013.01); *E01C 9/086* (2013.01); *B32B 2260/046* (2013.01); *B32B 2264/0207* (2013.01); *B32B 2307/554* (2013.01); *B32B 2307/712* (2013.01)

(58) Field of Classification Search
CPC ................. Y10T 428/239; Y10T 428/24066; B32B 3/18; B32B 21/12; B32B 21/04; B32B 21/042; B32B 7/00; B32B 7/005; E01C 5/22; E01C 5/223; E01C 5/226; E01C 9/08

USPC ................. 428/76, 106; 404/34–46
See application file for complete search history.

(56) References Cited

U.S. PATENT DOCUMENTS

| | | |
|---|---|---|
| 4,462,712 A | 7/1984 | Penland, Sr. |
| 4,629,358 A | 12/1986 | Springston et al. |

(Continued)

FOREIGN PATENT DOCUMENTS

| | | | | |
|---|---|---|---|---|
| FI | EP 2705950 A1 * | 3/2014 | ............... | B32B 3/18 |
| JP | WO 9525076 A1 * | 9/1995 | ............... | E01C 7/30 |
| WO | 2007/112537 A1 | 10/2007 | | |

OTHER PUBLICATIONS

Forest Products Laboratory. Wood Handbook—Wood as an Engineering Material—4. Mechanical Properties of Wood. U.S. Department of Agriculture. Online version available at: app.knovel.com/hotlink/pdf/id:kt0052LP04/wood-handbook-wood-an/mechanical-properties.*

(Continued)

*Primary Examiner* — Maria Veronica Ewald
*Assistant Examiner* — Ethan A Utt
(74) *Attorney, Agent, or Firm* — Winston & Strawn LLP

(57) ABSTRACT

An industrial mat that has a core construction that provides strength and rigidity to the mat, with the core construction being formed of a support structure that includes one or more elongated components or a plurality of elongated members of wood, engineered wood, a thermosetting plastic material or a metal. The mat includes an encapsulation of a durable skin that includes crumb rubber particles embedded in a polyurethane matrix that surrounds and encapsulates the entire core construction. The skin has a thickness sufficient to provide environmental resistance to the core construction to which it is applied while also providing abrasion resistance to the mat.

20 Claims, 8 Drawing Sheets

(51) Int. Cl.
*B32B 21/12* (2006.01)
*B32B 21/04* (2006.01)
*B32B 3/26* (2006.01)
*B32B 15/095* (2006.01)
*B32B 27/08* (2006.01)

(56) References Cited

U.S. PATENT DOCUMENTS

| | | | |
|---|---|---|---|
| 4,889,444 A * | 12/1989 | Pouyer | E01C 9/086 404/34 |
| 5,139,845 A * | 8/1992 | Beckerman | B32B 3/12 404/46 |
| 5,342,260 A | 8/1994 | Markland | |
| 5,822,944 A | 10/1998 | Penland, Sr. | |
| 5,888,612 A | 3/1999 | Needham et al. | |
| 6,231,994 B1 | 5/2001 | Totten | |
| 6,380,309 B1 | 4/2002 | Parker et al. | |
| 6,511,257 B1 | 1/2003 | Seaux et al. | |
| 6,662,508 B1 | 12/2003 | Else | |
| 7,404,690 B2 | 7/2008 | Lukasik et al. | |
| 7,818,929 B2 | 10/2010 | Fiutak et al. | |
| 8,061,929 B2 | 11/2011 | Dagesse | |
| 8,088,477 B2 | 1/2012 | Curtis et al. | |
| 8,382,393 B1 | 2/2013 | Phillips | |
| 8,613,373 B2 | 12/2013 | Holtby et al. | |
| 8,906,480 B2 | 12/2014 | Fiutak et al. | |
| 9,315,951 B1 * | 4/2016 | Penland, Jr. | E01C 9/086 |
| 2004/0071914 A1 * | 4/2004 | Fiutak | E04C 3/14 144/344 |
| 2005/0022363 A1 * | 2/2005 | Harrison | E01C 9/086 29/525.01 |
| 2007/0056228 A1 | 3/2007 | Penland, Sr. et al. | |
| 2007/0237581 A1 * | 10/2007 | Lukasik | E01C 9/086 404/35 |
| 2008/0085154 A1 * | 4/2008 | Lukasik | E01C 9/086 404/35 |
| 2008/0152861 A1 | 6/2008 | Barker | |
| 2009/0087261 A1 | 4/2009 | Fournier | |
| 2011/0280657 A1 * | 11/2011 | Martinez | E01C 9/086 404/41 |
| 2012/0063844 A1 | 3/2012 | Wold | |
| 2013/0306804 A1 | 11/2013 | Holtby et al. | |
| 2014/0154462 A1 * | 6/2014 | Fiutak | E01C 9/086 428/119 |
| 2014/0193196 A1 | 7/2014 | Fournier | |
| 2014/0199119 A1 * | 7/2014 | Stasiewich | E01C 9/08 404/41 |

OTHER PUBLICATIONS

"Inflammable". Wiktionary. Archived Sep. 6, 2014.*
International Search Report and Written Opinion, Appl. No. PCT/US2016/020081, Jun. 2, 2016.

* cited by examiner

MAT CONSTRUCTION HAVING ENVIRONMENTALLY RESISTANT SKIN

BACKGROUND

The present invention relates to a reusable system for the construction of roadways and equipment support surfaces in areas having poor ground integrity characteristics. More particularly, the present invention relates to a system of durable mats which can be interconnected to form roadways and/or equipment support surfaces. More particularly still, the present invention relates to a reusable system of mats which can be quickly and easily positioned in a single layer to form roadways and/or equipment support surfaces, and which can thereafter be easily removed and stored until needed again.

Mats for this use are generally known in the art and are available from Quality Mat Company, Beaumont, Tex. In remote and unstable environments, a stable roadway (or any roadway) often does not exist, such that temporary roadways are assembled by aligning planks, boards or mats along the desired path. The mats provide temporary structures for various construction projects as well as for use in environmental or disaster cleanup projects. These mats enable trucks and other equipment to drive over, store equipment on, or create campsites on otherwise unstable, soft or moist land or damaged areas by providing a relatively level and stable surface.

While conventional wood mats provide useful service at a reasonable cost, the wood core, which is typically made of hardwood, can deteriorate over time due to moisture causing gradual rotting and degradation of the wood material. This causes the mat to be discarded, because unlike some of the other materials that are used on the upper and lower layers of the mat, the core cannot be replaced without essentially making an entirely new mat.

While various mats exist for such uses, there is a need for mats having improved resistance to wood deterioration as well as to abuse of and damage to the mats in order to extend their service lives. The present invention now provides new mat constructions that meet this need.

SUMMARY OF THE INVENTION

The invention relates to an industrial mat comprising a core construction that provides strength and rigidity to the mat, the core construction comprising a support structure that includes one or more elongated components or a plurality of elongated members of wood, engineered wood, a thermosetting plastic material or a metal; and an encapsulation of a durable skin comprising crumb rubber particles embedded in a polyurethane matrix that surrounds and encapsulates the entire core construction, with the skin having a thickness sufficient to provide environmental resistance for the core construction to which it is applied while also providing abrasion resistance to the mat.

The durable skin preferably has a thickness of at least about 0.25 inches and preferably between about 0.25 and 2 inches. The encapsulation skin generally comprises at least 55 to 80% by weight of crumb rubber and 20 to 45% by weight of polyurethane. Also, the support structure of the core construction preferably comprises one of (a) fastened plural layers or plies of elongated components or members at least some or all of which are wood; (b) one or more elongated components or members of engineered wood wherein plural components or members are joined together; (c) one or more elongated components or members of a thermosetting plastic material which optionally include apertures therein or therethrough, again wherein plural components or members are joined together, and with the thermosetting plastic material optionally reinforced to provide additional strength or stiffness; or (d) one or more elongate components or members of metal wherein plural components or members are joined together. For these embodiments, the components or members generally have a thickness of not less than 0.75 inches and not more than about 12 inches.

When the core construction includes a plate or sheet, the entire core construction is provided with the encapsulation and the encapsulation comprises elongated crumb rubber members that mimic the elongated members of a three layer wood mat. These crumb rubber members form part of the encapsulation and provide impact resistance to the mat.

In some embodiments, the core construction includes engineered wood made of adhered veneers, with the core construction comprising (a) a single block having a thickness of between about 2 and 4 inches, a width of between about 4 and 6 feet and a length of between about 12 and 16 feet; or (b) one or more base blocks, each having a thickness of between about 1 and 3 inches, a width of between about 4 and 6 feet and a length of between about 12 and 16 feet and a plurality of reinforcement sections having a thickness of between 1 and 3 inches and a width that is the same as that of the base blocks, wherein each reinforcement section is positioned in contact with adjacent reinforcement sections. It is preferred that most of the veneers are oriented in a machine direction and between 5 and 30% of the veneers are oriented in the cross machine direction.

BRIEF DESCRIPTION OF THE DRAWINGS

The appended drawing figures provide additional details of the invention, wherein.

DETAILED DESCRIPTION OF THE INVENTION

Figure 1:
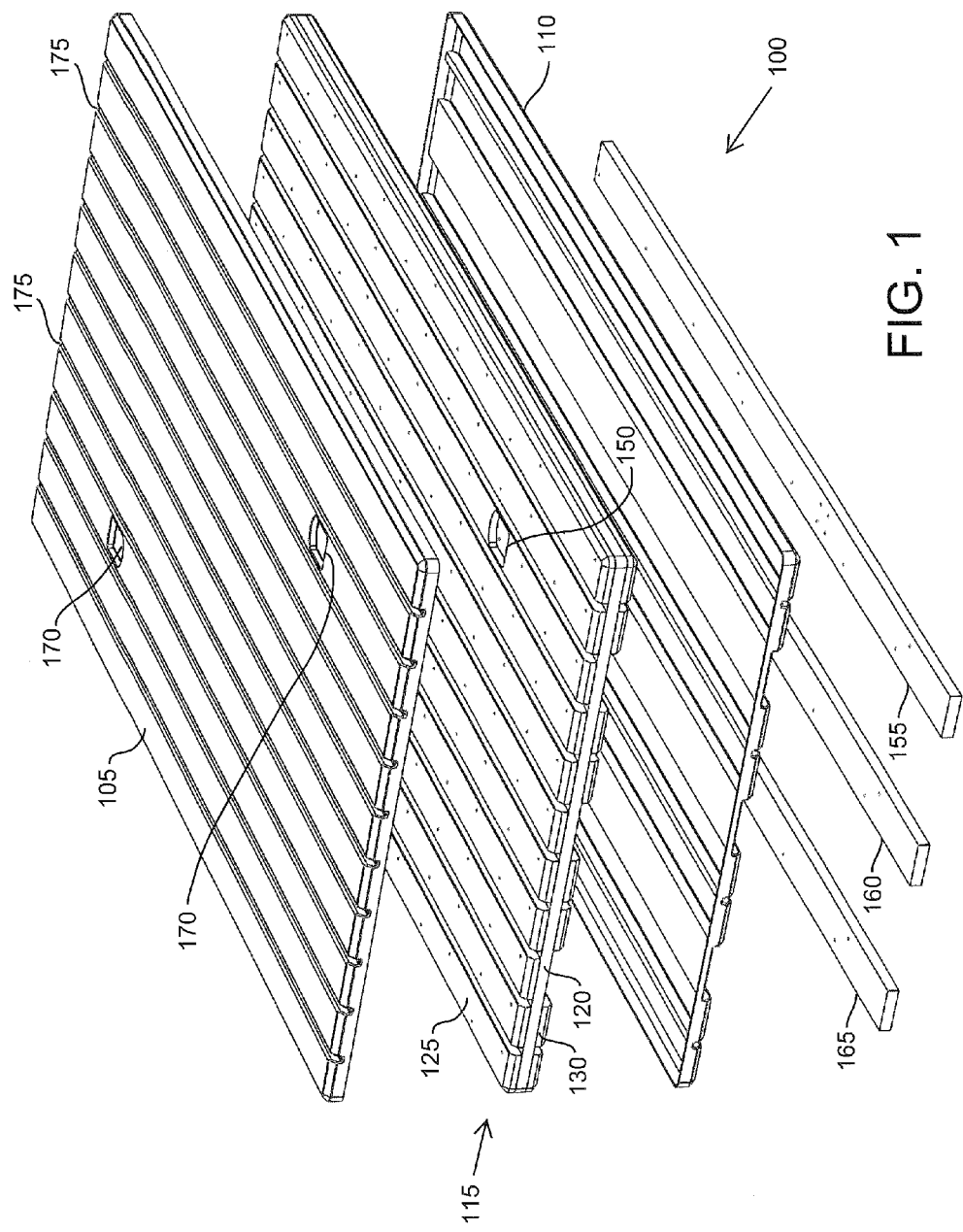
FIG. 1 is an exploded view of the mat of the invention showing the use of single width boards for the core construction including the central, upper and lower layers, with the encapsulation artificially separated into upper and lower portions to illustrate its position about the core construction.

The present invention now provides an improved mat that possesses better environmental resistance due to the provision of an encapsulation of a durable skin that surrounds the entire core construction of the mat. The skin is made of crumb rubber particles that are held in a polyurethane matrix to form an environmentally resistant coating around the core construction.

Certain terms that are used herein are defined hereinbelow to assist in the understanding of the invention.

The term "environmentally resistant material" means a material that is not subject to deterioration by water, moisture or other environmental conditions when compared to a conventional wood material such as white oak that is commonly used for such mats. This term includes the thermosetting materials disclosed herein as well as metals such as steel, aluminum or stainless steel.

The term "industrial mat" is intended to cover relatively large mats having widths of at least about 4 feet to about 8 feet with lengths running from about 4 feet to 40 feet and incorporating elongated members, beams or other components having square or rectangular cross sections of sizes of at least about 1×6 to 12×12 inches with lengths from about 4 feet to as much as 40 feet or more. As noted, previous and current mats of this type that are commercially available are primarily constructed of monolithic wood.

The term "substantially" is used for its ordinary meaning to indicate that the dimensions are not precise or exact. A skilled artisan can readily determine what tolerances are acceptable to provide a surface that is considered to be flat based upon the size of the side beams and the type of service that the mat is expected to provide. There is no requirement that the beams and elongated members be flush with each other along the top and bottom surfaces of the mat. Typically, the term "substantially" will mean that the top surfaces of the beams and elongated members can vary by as much as a few inches although in the more preferred embodiments the variance is less than 1 inch.

Additionally, all dimensions recited herein are approximate and can vary by as much as ±10% to in some case ±20 or 25%. In some situations, the term "about" is used to indicate this tolerance. And when the term "about" is used before reciting a range, it is understood that the term is applicable to each recited value in the range. Often, the craftsmanship and engineering procedures that are followed in construction of these mats minimize these tolerances as much as possible or industrially practical.

The term "elongated component" means a sheet or plate type support structure that has lengths and widths that represent at least about half the length and width of the mat up to the full length and width of the mat. The component can be solid or can include openings or one or more compartments. The width of the elongated component is at least 4 times greater than its thickness. Generally, the width of the component can be between 4 and 100 times its thickness but typically general it would be between 4 and 24 times its thickness. Preferred dimensions are further discussed herein.

The term "elongated members" means a board, beam, rod, tube or box type support structure having a length that represents at least about half up to the full length of the mat. The width of the elongated member is generally between 0.5 and 8 times its thickness but typically it would be between 1 and 6 times its thickness. Preferred dimensions are discussed herein.

It is also understood that as long as the core construction includes the recited elongated components or members having the thicknesses and structural features disclosed herein, the mat may include other components having different dimensions or configurations without departing from the invention. For example, a "half-size" elongated member may be used near the sides of the mat for interconnection with the side of an adjacent mat. A skilled artisan can thus configure the mat with additional components or members of different sizes so that the mat can provide the desired performance when in use.

The present invention provides an improved combination of a strength providing core construction and an encapsulation of a crumb rubber/polyurethane material. The core construction may be of many different materials or constructions. This includes a fully formed two or three layer wood mat, engineered wood, a steel ladder, or a fiberglass reinforced thermosetting plastic (FRP) support structure in the form of a plate, grid, ladder or pultruded tubes. The encapsulation of the mat is preferably formed of crumb rubber particles from motor vehicle tires that are bound together using a polyurethane as a binder or matrix.

The core of the mat being a wood mat, engineered wood, steel ladder or FRP support structure provides stability and strength to the mat, yet are protected by the encapsulation so that the desirable strength properties of the core are preserved. This is of particular concern when the core is made of wood, since the encapsulation would prevent moisture from contacting and eventually degrading the wood, but it also would protect a steel core from oxidation or rusting, and would also provide impact resistance to FRP components or members. The resulting one piece mat is easily transported and installed in the same manner as wood mats. Thus, temporary roadways, temporary road coverings and the like can be easily provided and will be stable and long-lasting even under heavy loading and soft, pliable ground conditions and extreme weather conditions. A temporary roadway or working surface formed by the mats of the present invention will be secure and will not require a great deal of maintenance and will still provide secure traction to vehicles yet will be easy to place and remove with little, or no, disturbance to the environment.

In a preferred embodiment, the invention relates to an industrial mat comprising a core construction that provides strength and rigidity to the mat, the core construction including plural layers or plies of components at least some or all of which are wood or engineered wood; and an encapsulation of a durable skin that surrounds and encapsulates the entire core construction, with the skin having a thickness sufficient to provide environmental resistance to the core construction to which it is applied while also providing abrasion resistance to the mat. The woods that can be used in this mat include white oak or other hardwoods that are commonly included. The invention is also operable with pine or other softwoods as these are all protected by the encapsulation.

When multiple components or members are provided, they would preferably be fastened together using any acceptable technique, including the use of nails, rivets or bolts or even adhesives for wood or engineered wood members or components, the bonding of different FRP components or members together using the same or a different resin that is compatible for bonding those materials together, or by the welding or brazing of steel, aluminum or other metal components or members.

In an preferred embodiment, the mat advantageously includes a core construction comprising a central layer made of a sheet, a plurality of elongated members, a plurality of compartments, or combinations thereof and the entire core construction is provided with the encapsulation. The core construction can also include one or both of an upper layer positioned above the central layer and a lower layer positioned below the central layer, wherein the upper and lower layers are each made of a sheet, a plurality of elongated members, a plurality of compartments, or combinations thereof.

Preferably, each layer includes a plurality of elongated members of wood or engineered wood with the elongated members having a thickness of not less than 0.75 inches nor more than about 12 inches and preferably between about 1 and 8 inches. For convenience in manufacture, all elongated members in the core construction would have approximately the same thickness. The central, upper and lower layers each preferably comprises a plurality of wood or engineered wood boards having a modulus of at least about 1.6 M psi.

For each embodiment, the core construction is designed to provide a load bearing capacity that enables the mat to withstand a load of at least 600 to 800 psi without permanently deforming the core construction. When multiple plies or layers are provided, the boards are fastened together using any acceptable technique, including the use of nails, rivets or bolts or even adhesives. As these components are encapsulated, deterioration of the wood or the fastening means is prevented due to the presence of the encapsulation. When the outer offset boards of wood or engineered wood are attached to the mat with nails, rivets or bolts, O-rings or gaskets are preferably provided beneath the nail, rivet or bolt heads and nuts to prevent moisture from entering into the holes in the elongated wood or engineered wood components or members where the moisture could eventually cause the wood to deteriorate.

The present invention provides an improved mat that possesses structural integrity based on the properties and configuration of the core construction as well as abuse and abrasion resistance provided by the encapsulating skin. The skin, also referred to as the encapsulation or encasement, comprises crumb rubber particles that are embedded in a polyurethane matrix. The skin has a thickness of about 0.25 to 2 inches and preferably is about 0.5 to 1.5 inches thick.

Advantageously, the encapsulation includes crumb rubber particles that are generated by grinding used automobile and truck tires. During the recycling process steel and tire cord (fluff) is removed, leaving tire rubber that has a granular consistency. Continued processing reduces the size of the particles further. The particles are sized and classified based on various criteria including color (black only or black and white). The granulate is sized by passing through a screen, with the size based on a dimension or mesh. The particular size for the crumb rubber of the invention is that which is between 0.1 and 0.4 inches and the particles are generally uniform and are within that range. These sizes maximize the area of interaction with the polyurethane to provide optimum properties to the encapsulation.

The crumb rubber particles are held in the encapsulation by being embedded in a polyurethane matric or binder. Polyurethane is a polymer composed of a chain of organic units joined by carbamate (urethane) links. While most polyurethanes are thermosetting polymers that do not melt when heated, thermoplastic polyurethanes are also available and either one can be used in the encapsulations disclosed herein. The thermosetting polymers are preferred for use because they are generally harder and less subject to degradation or deterioration from high temperatures. These polymers are traditionally and most commonly formed by reacting a di- or polyisocyanate with a polyol. Both the isocyanates and polyols used to make polyurethanes contain on average two or more functional groups per molecule. Any polyol and isocyanate can be used herein although it is preferred that the resulting polyurethane polymer or resin be one that has good impact and abrasion resistance and a medium hardness so that it can withstand vehicle movement thereover or equipment place thereupon without permanently deforming. Routine tests can be conducted to determine the optimum polyurethane resin (i.e., the isocyanate and polyol components) for any particular industrial mat application.

The encapsulation protects the core construction from degradation due to weather conditions, typically moisture or water from rain or snow, as well as contact with oil, gas or other chemicals. Also, the encapsulation will not absorb liquid contaminates so that after cleaning or washing, the mat can be removed from the work site without transporting liquid contaminates.

The encapsulation can be provided by a number of different techniques. For encapsulating a wood mat, a mold is prepared with a bottom surface that is configured to mimic the bottom surface of the two or three ply wood mat. The bottom surface of the mold is connected to side portions to form a well. In the particular configuration desired for a conventional three ply wood mat, the bottom surface of the mat has three elongated openings which can receive three external boards that are configured in an offset manner in order to allow interconnection of one mat with an adjacent mat.

The sides of the mold are smooth and essentially vertical. A slight draft angle may be provided to assist in removing the mat from the mold after the polyurethane sets and cures. In particular, the draft angles are a few degrees (i.e., 2 to 7) off vertical and extend outward such that the sidewalls are preferably placed at an angle of 92 or 93° with respect to the base or lower portion of the mold.

The top surface of the mold is a separate plate that is configured in a like manner as the bottom surface of the mold to provide the appropriate surface contour on the top of the mat as the lower mold surface provides on the bottom of the mat. The top and bottom mold surfaces are also configured to provide additional surface features, such as drainage channels, recesses for lifting elements, or openings for other peripherals. As shown in the drawings, a number of water removal channels are provided and these are imparted into the top surface of the encapsulation because they are configured as raised areas in the mold plate.

The mold well is first filled with approximately 0.5 to 2.5 inches of crumb rubber particles. The mold may include a fill line or other markings to indicate the upper level of the rubber crumb particulate matter that is to be introduced into the well. The crumb rubber can be added to the mold in many ways, such as with use of an air blower and pipe connected to a supply of the crumb rubber particles. Of course, the particulate matter can simply be dumped in the mold from pails or other sources to fill the mold well to the appropriate level.

Thereafter, the mat is placed into the mold with the bottom surface facing the crumb rubber. The bottom surface of the mat is also provided with positioning pins so that it is supported approximately 0.25 to 2 inches above the lower mold surface. These positioning pins can take many different forms. In one arrangement, these pins can be cones or other protrusions extending from the bottom surface of the mat. In a preferred arrangement, these pins are bolts that are screwed into holes in the mat that extend the desired distance away from the bottom of the mat so that it can be placed and situated properly in the mold. These bolts are connected to threaded openings that will later receive bolts to secure the three offset boards that are used to interconnect one mat to an adjacent mat. A sufficient number of positioning pins will be provided to properly set the mat into the mold. For a mat that is 14 feet long, at least five to seven positioning pins will be used on each location where a board will be attached for interconnection of the mat. This results in at least 15 to 21 positioning pins being provided for properly placing the mat at the correct position in the mold. The weight of the mat generally enables the pins to contact the bottom mold surface but if not the later closing of the mold will urge the mat downwardly until the pins contact the bottom mold surface.

When the mat does not have interlocking boards or other interlocking structures, the core construction can include inverted cones that has their apexes contacting the base of the structure for positioning the mat in the mold. These cones can be made of the same material as the polyurethane matrix or resin that is to encapsulate the core construction. The base of each cone is attached to the core construction by an adhesive or a fastener (screw, nail or rivet) with sufficient cones provided so that the core construction is securely and uniformly supported in the mold. When the polyurethane forming mixture is introduced into the mold, it can flow around the cones and provide a bottom surface of the mat that only has very small dots where the cone apexes contact the bottom of the mold. This provides a much better appearance than when the cone base (or a rod, bolt or cylinder) contacts the mold. And as the cones are made of the same material as the encapsulation matrix, they blend together well in the final encapsulated mat.

After the mat is positioned in the mold, it is then covered with an additional 0.5 to 2.5 inch layer of rubber crumbs which will be used to form the top surface of the encapsulation of the mat. The crumb material also is provided between the sides of the mold and the mat to provide the side encapsulation. For this the mold is configured to be 1 to 4 inches wider than the width of the mat. Alternatively, pins or spacers can be used to center the mat in the mold. Thereafter, the upper mold surface is placed upon the rubber crumb layer and is clamped in position so that the final encapsulation thickness is controlled to the desired value. The top surface of the mat can also be provided with pins in the same manner as the bottom surface so that the mat is precisely positioned between the top and bottom mold surfaces. This assures that the encapsulated mat will have an encapsulation of between at least 0.25 and 2 inches on both the top and bottom surfaces as well as the sides of the mat.

As a specific example, the mold can be 8 feet 1.5 inches by 12 feet 1.5 inches so that it can receive a two layer wood frame that is 8 feet by 12 feet. The wood frame can be placed 1 inch above the bottom of the mold and 1 inch below the top mold plate so that the outer surfaces of the resulting encapsulation will have a thickness on the order of 1 inch.

Conventional internal or external mold release agents can be applied to all mold surfaces prior to starting the process in order to assure a fast release of the encapsulated mat out of the mold after the mixture has fully set and cured. These agents are generally fluorocarbon based. Alternatively, all surfaces of the mold can be provided with a paper layer or plastic film so that the polyurethane does not adhere to the mold.

After the mold is secured in position, the polyurethane forming components, i.e., a polyol/isocyanate mixture, is introduced into the mold. The resin can be introduced into different sections of the mold at a number of locations. As the mixture has a relatively low viscosity, it will fill in all voids between the crumb rubber particles and the mat or mold surfaces as well as being able to flow throughout the rubber crumb layers to saturate each particle and the spaces around it. After the mixture sets and cures, the rubber crumb particles are embedded in the final polyurethane matrix that is formed. If desired, the mold can include vacuum lines that will assist in the assuring that the polyurethane-isocyanate mixture flows throughout the rubber crumb layers. Additionally, it is possible to add some of the resin initially when the rubber crumb is added with the two being either mixed together or with the rubber crumb initially introduced into the mold followed by application of the liquid polyol/isocyanate mixture. As the mixture tends to set over time, the introduction of the resin components to the mold must be done in a relatively quick manner. For this reason it is preferred to introduce the material through various ports in the mold into the crumb rubber as soon as possible after the polyurethane and isocyanate components have been mixed together.

The preferred polyurethane forming components are those that provide low matrix or resin viscosities which in turn allow for the fast injection or introduction of the resin into the mold while providing good wetting of and penetration between the crumb rubber particles. The preferred resin system can be tailored to provide a reaction or working time of between about 5 and about 20 minutes as this enables the resin to completely fill in all spaces between the crumb particles and any openings in the core construction.

Once it is confirmed that the resin has been introduced throughout the rubber crumb particles, the mixture is allowed to cure for a sufficient period of time to form the encapsulation. The curing time will depend upon the reaction or working time and the temperature of the mold. The mold can be heated to accelerate curing if desired, but this is generally not necessary. The reaction between the polyol and isocyanate is an exothermic one and it also provides heat as well as resulting in an expansion of the material as cures. The fixing or clamping of the mold surfaces to prevent any outward expansion thus concentrates the expanding polyurethane material as a matrix in, around and between the rubber crumb particles in order to form a dense but compact encapsulation around all outer surfaces of the mat.

After the polyurethane has cured, the mold is opened by removing the top plate so that the mat can be removed from the mold. For this purpose, the lower mold surface can be provided with lifting pins or other known structures that will raise the formed mat above the bottom surface of the mold. This action combined with the draft angle provided on the sides of the mold frees the mat from being embedded in the mold and allows its removal. In some embodiments, the upper surface of the mat can be provided with lifting elements which are prevented from contacting the rubber crumb and polyurethane matrix forming mixture so that after curing of the resin and opening of the mold, these lifting elements are exposed to allow a hook from a crane or other lifting device to lift and extract the formed mat from the mold.

The molding process can be batch or continuous as desired. For a batch process, all operations are conducted on a single mold. After the mold release agents are added to the mold, a bed of rubber crumbs is initially laid in the mold well, the core construction is deposited on top of the bed of crumbs, and the additional rubber crumbs are added onto and around the core construction. The top mold surface is added and the entire unit would enter the press area where final forming would be done. After the press and curing operations are completed, the finished encapsulated mat can be removed from the mold.

An automated process is also possible. Several single molds are arranged on a circular track. A mold on a cart is provided with mold release at a first station; it then moves to a second station where an initial rubber crumb layer is added. The cart then moves to a third station where the mat is added. The cart next moves to a fourth station where additional rubber crumbs are added. The cart then is moved to a fifth station where the top mold surface is applied and the resin is introduced. The cart and fully loaded mold then moves to a sixth station where the press conducts the final forming and curing. Once out of the press, the encapsulated mat would be removed at a seventh station and the empty cart then moved back to the first station to start the process over again. Using seven carts allows the activities at each station to be conducted simultaneously and in a continuous manner on seven different molds.

As mats are generally designed with water channels on the upper surface or layer to drain water from the mat, the skin must also be configured with the same design to achieve that purpose. Accordingly, the lower surface of the upper mold plate is not flat but is instead configured to match the boards of the mat. Alternatively, when the core construction provides a flat upper surface, the upper portion of the skin can be provided with water channels or other non-flat surfaces. In fact, the upper portion of the skin can be configured to provide molded material in place of the upper layer of elongated members of the core construction. In effect the rubber crumb forms elongated rod or board like structures that mimic the upper board layer of the three ply mat. The same can be done for the lower portion of the skin which can also be provided with openings to receive the offset boards for interlocking with adjacent mats.

When the core construction is flat or has openings, greater amounts of crumb rubber and resin are utilized so as to form raised crumb rubber structures on the flat surfaces of the core construction, or to fill in the holes or openings in the core construction.

In a preferred embodiment, the core construction housed within the encapsulation comprises two or three structural layers: a central layer for strength and rigidity; and a layer of elongated members positioned above or below the central layer. Preferably, three layers are present. Suitable materials for the components of the upper, center and/or lower layers of the core construction include any of the materials mentioned in this application. Wood and preferably engineered wood is the most preferred due to the balance of cost and desirable properties, but in addition, metal, thermoplastic and thermosetting materials, and elastomeric materials may instead be used.

The crumb rubber material is commercially available and is typically prepared by grinding worn or discarded rubber vehicle tires. This material can be mixed with a thermoplastic or thermosetting polyurethane forming mixture and set or cured in place to form the skin around the mat.

The crumb rubber encapsulation disclosed herein can also be provided with conventional filler materials to increase weight, strength or hardness. These can be added to the crumb rubber particles prior to contacting the polyurethane forming component. In some embodiments, the reinforcing materials can be added to the polyurethane forming component prior to contact with the crumb rubber. Another option is to arrange the crumb rubber particles and reinforcing material in the mold prior to introducing the polyurethane forming material therein. The reinforcing materials include inorganic particulates such as silica, alumina, mica or even sand or fine gravel, fiberglass or other fibers, or fabric or metal sheets, screening or scrim. These materials reduce elongation and provide greater rigidity to the polyurethane matrix that surrounds the crumb rubber.

Preferred materials for fiberglass reinforced plastic support structures that can be used as the core construction include various thermosetting materials, including Epoxy, Melamine formaldehyde (MF), Phenol-formaldehyde (PF), Polyester, Polyurethane (PU), Polyurea, Polyimide (PI), Silicone (SI) or Urea formaldehyde (UF). These materials can be reinforced with fibers or filler (carbon, glass, metal, etc.) as desired or necessary. And while glass mat, scrim or fabric is a common form of reinforcement, other conventional reinforcement materials can be used instead of glass or fiberglass. These additional reinforcements are included in the abbreviation "FRP."

For construction materials of FRP or metal that includes an open structure or openings therein or therethrough, the openings can optionally be filled or reinforced with wood, metal or plastic materials. The openings filled with these or other materials enables the support structure to provide the desired weight to the mat. Also, reinforcements of fabrics, sheets or other closing materials for such openings can be used to improve stiffness and strength of the support structure and if necessary to separately retain the filler in the openings.

It is also possible to use a metal plate or open metal structure as the support structure or center layer of the core construction, either alone or with upper and/or lower plies or layers of other materials. Thus, the structure can include multiple components that are assembled together to form the mat. The center layer can be used alone or it can include additional layers or plies of elongated components or members, such as upper and lower layers of wood or engineered wood boards.

When metal structures are used as the core construction or as a central layer of the core construction, the metal structures may include metal lath, metal sheet or metal structures or fabrications in the form of frames, ladders, etc. Openings are typically provided to reduce the overall weight of the mat. Steel, aluminum or stainless steel are typical metals for this use. To reduce the weight of the mat when the construction core it is made of metal, a honeycomb or lathe structure may be used, or as noted the construction core may be provided with a plurality of openings. For very open structures, the openings can be filled as noted above with a material that is lighter than the metal to maintain the weight of the structure at a desired level.

Any openings or open structures of the core construction can be covered with upper and/or lower sheeting to retain filler therein. Any material can be used for the sheeting as the metal core is providing the necessary strength and rigidity to the mat. Typically, the sheeting may be plywood, plastic, metal or composite material, and can be solid or in mesh form. The sheeting can be attached to the mat by bolting or by an adhesive. The sheeting and core can be maintained in position by being sandwiched between the outer layers, with the entire support structure held together by bolting. If necessary, holes for the bolts can be drilled through the metal plate or sheeting to facilitate assembly by allowing passage of the bolts therethrough.

And in a further embodiment of the invention, the provision of apertures or openings in the core construction enables the crumb rubber and polyurethane matrix to be received therein, thus forming stronger bonding of the encapsulating skin to the mat as it not only encapsulates the outer surfaces of the mat but it also penetrates and passes through the openings to join the top surface of the encapsulation to the bottom surface.

Preferably for wood core constructions that have three layers or plies, the upper, central and lower layers are nailed and/or bolted together. For a core construction where the interlocking boards (boards 3, 6 and 9 of the single width construction and the three 6" boards of the double width construction) are not included, these may be provided on top of the skin. They can be bolted or nailed onto the core construction through the skin, but with appropriate sealing of the skin with additional material to prevent water or chemical penetration into the wood components or members. This arrangement provides two additional benefits. First of all, the boards placed outside of the skin are easily replaceable if damaged while the protected core remains intact.

The most preferred construction includes one, two or three layers of engineered lumber. Engineered lumber, also known as composite wood, man-made wood, or manufactured board; includes a range of derivative wood products which are manufactured by binding or fixing strands, particles, fibers, or veneers or boards of wood, together with adhesives, or other methods of fixation to form the composite material known as engineered lumber. These products are engineered to precise design specifications and tolerances which are much more controlled than ordinary wood products and meet various national or international standards and these controlled dimensions are carried over into the construction of the mat. Typically, engineered wood products are made from the same hardwoods and softwoods used to manufacture lumber.

There are three types of engineered wood that can be used in the present invention:
   parallel strand laminate (PSL), which is a beam that can be manufactured up to about 12×12 inches in any length due to the production of the beam by a continuous process;
   layered stand laminate (LSL), which is a billet that can be made at thicknesses of from about 1" to 4", in widths from about 2 inches to 54", and in lengths of about 8 feet to 64 feet; and
   layered veneer laminate (LVL) which is also a billet that can be made up to about 4 feet square by any length.

The preferred types of engineered lumber are laminated strand lumber (LSL) layered veneer laminate (LVL). The thickness of these lumber beams will be what is called 2×8 inches, which is actually approximately 1.75 inches thick but may be between 1.5 and 3 inches. Length can be as desired but will preferably be 12, 14 or 16 feet. The width of the LSL or LVL boards will vary depending upon location within the three layer mat. That is, width of the top and bottom layer boards will be approximately 8 inches (single width) or 16 inches (double width). Approximately means they may be slightly less such as 7.5 to 8.5 inches or 15 to 17 inches. Of course, as the LSL or LVL is manufactured, any particular thickness, width and length can be selected, but the preferred dimensions disclosed herein approximate those of conventional white oak mats which are in extensive use in the industry. A typical thickness for the mat is approximately 6" to 8", with the central layer providing a thickness of about 1" to 6" and preferably 2 to 4" and the upper and lower layers providing a thickness of about 1" to 3". Of course, the dimensions can vary depending upon the specific end use intended for the mat. The encapsulating skin provides another 0.5 to 4 inches in thickness due to the 0.25 to 2 inch thickness of the skin that surrounds the core construction.

The most preferred mat sizes are those that are 4 to 8 inches thick due to a two or three layer wood or engineered wood board construction, with a length of 12 to 16 feet and a width of 8 feet.

The center layer will be approximately 4 to 8 feet by 12, 14 or 16 feet. The center layer may be made of LSL, LVL or other boards that are oriented perpendicularly to the boards of the top and bottom layers. The number of top, bottom, and center boards will be dictated by the final dimensions of the mat for the particular application or end use. When the center layer is a sheet or plate, the boards of the upper and lower layers can be oriented in the same or a different direction. Generally, for manufacturing simplicity, the boards of these layers are oriented to be parallel or perpendicular to each other. Other more complex angled board arrangements may also be used without departing from the teachings of this invention.

In a most preferred embodiment, the mat includes a core construction comprising a central layer, an upper layer positioned above the central layer and a lower layer positioned below the central layer, wherein each layer includes a plurality of elongated members of wood or engineered wood having thickness and width dimensions of approximately 2" by 8", and with each having a modulus of 1.6 M psi±20% up to about 2 M psi±20% and with the elongated members of the upper and lower layers oriented parallel or perpendicular to each other. Also, the core construction is made of materials that provide a load bearing capacity that is able to withstand a load of at least 600 to 800 psi without damaging or permanently deforming the core construction.

The core construction can include one, two or three layers as desired or necessary for a particular installation. The most preferred construction includes three layers as noted herein.

When elongated members are used for the upper and/or lower layers of the core construction, they provide additional weight to the mat and can be configured in different ways:
   (a) a single width construction may be used where eleven 6" wide (by 12' 14' or 16' long) boards are provided in the upper and lower layers with three boards (nos. 3, 6, and 9) in the lower layer offset for interlocking; or
   (b) a double width construction may be used where four 12" wide (by 12 or 16' long) boards are provided in the upper and lower layers: each one separated by a 6" board with the three 6" boards in the lower layer offset to provide interlocking.

The boards can be made of wood or engineered lumber (preferably with a tolerance of ±1/16") or they can be made of tubes of metal of a thermoplastic or thermosetting material, with pultruded thermosetting tube being one example of a preferred alternative material.

The core constructions may include those made of white oak as disclosed in U.S. Pat. No. 4,462,712 (three layer) and U.S. Pat. No. 5,822,944 (two layer), the entire content of each of which is expressly incorporated herein by reference thereto. Additional processing of the wood will ordinary be required to achieve the desired tolerances for optimum fitting of the construction core in the encapsulation pieces.

Referring now to the Figures, FIG. 1 is an exploded view of an encapsulated mat 100 that shows the skin in two artificial sections, namely an upper skin 105 and lower skin 110 which are used to surround and encapsulate core construction 115. Of course, the skin is applied to completely surround the core construction but is shown herein as cut and separated so that the core construction 115 can be seen. The core construction includes a rectangular sheet 120 of wood, plywood, engineered wood, or a non-wood material such as a thermosetting resin or a metal. On the top surface of sheet 120, boards 125 are applied to the sheet 120 by nailing, screwing, bolting, adhesives or combinations thereof. On the bottom surface of sheet 120, boards 130 are also applied by nailing, screwing, bolting or adhesive joining of boards 130 to the sheet 120.

Preferably hardwood or LSL boards are used for the core construction with LSL used for the upper and lower boards to obtain a good balance of dimensional tolerance, cost and performance. Of course, hardwood can be used throughout for the lowest cost construction. When bolting is used, the bolts can extend from the upper boards 125 to the lower boards 130 through the sheet 120. The nails, screws or bolt heads and nuts are recessed below the top surface of boards 125 and below the bottom surface of boards 130 to present relatively smooth upper and lower surfaces of the core construction 115.

Alternatively, the boards can be attached to the sheet 120 by an adhesive or other means that provide a secure attachment. This allows wood boards to be used with a metal or FRP central layer. When the core construction is made of a thermosetting material, the sheet and boards can instead be made of the same material to form a unitary support structure. The same is true of a welded metal core construction. These materials can be mixed or matched depending upon the intended use of the mat. As noted, this preferably includes:

(a) One or more layers of engineered wood not less than about 1 inch nor more than about 12 inches thick;

(b) A grating material of a thermosetting plastic material of a polyester, epoxy or the others mentioned herein. The thermoset material may be reinforced with fiberglass, carbon, etc. Or it may be an unreinforced engineered polymer. Glass fiber reinforcement in an amount of about 50 to about 75% provides a high stiffness to the support structure;

(c) A thermosetting plastic material in the form of pultruded rods. These can be of solid or hollow tubular construction and are preferably square or rectangular in cross section. If desired, the openings can be filled with form or particulate matter; or (d) Any type of metal in whatever thickness is necessary, with steel being the most economical.

For the preferred wood mats, as shown in FIG. 1, eight (8) boards are used, with each two board pair separated by a space that would accommodate another board for interlocking of the mat with an adjacent mat. Both the upper and lower boards that are attached to the sheet 120 are arranged in the same way so that the same size mold portions can be used to form the encapsulation on the top and bottom surfaces of the core construction. Alternatively, the upper surface of the core construction can be provided with boards in the spaces so that the interlocking boards are provided only on the lower surface of the mat. For this, the upper mold part would be configured differently from the lower mold part.

As shown, spaces are provided for the third, sixth, and ninth boards (155, 160, 165, respectively) of the lower portion of the construction core 115 to allow such boards to be applied to the skin portions after encapsulation of the core construction 115 to thus allow interlocking of the mat to an adjacent mat. The boards 155, 160 and 165 are applied to the lower skin portion in order to extend outwardly from the end of the mat to be received in a space in the lower skin of an adjacent mat. Although these additional boards are attached to the mat by screwing or bolting, any holes made through the skin are also sealed or provided with O-rings to prevent introduction of water or moisture into the wood components or members of the core construction and degradation of the wood over time.

Openings 170 for receiving lifting elements are provided on the upper skin portion 105. These lifting elements may be configured as D shaped rings which are attached to the boards in recesses 170 so that the lifting element can remain flat when the mat 100 is in use. Two openings for lifting elements are shown but a skilled artisan can determine how many elements are needed for lifting of any particularly sized mat. If desired, openings can be provided for lifting elements to be installed on the boards attached to the lower surface of the mat for versatility in the handling and transportation. The lifting elements are provided on the boards that are attached to the skin so that if the lifting elements or boards are damaged they can be easily removed and replaced.

The provision of single width boards enables the upper and lower moldings to have water channels 175 on the upper surface of the skin to drain water from the mat.

Figure 2:
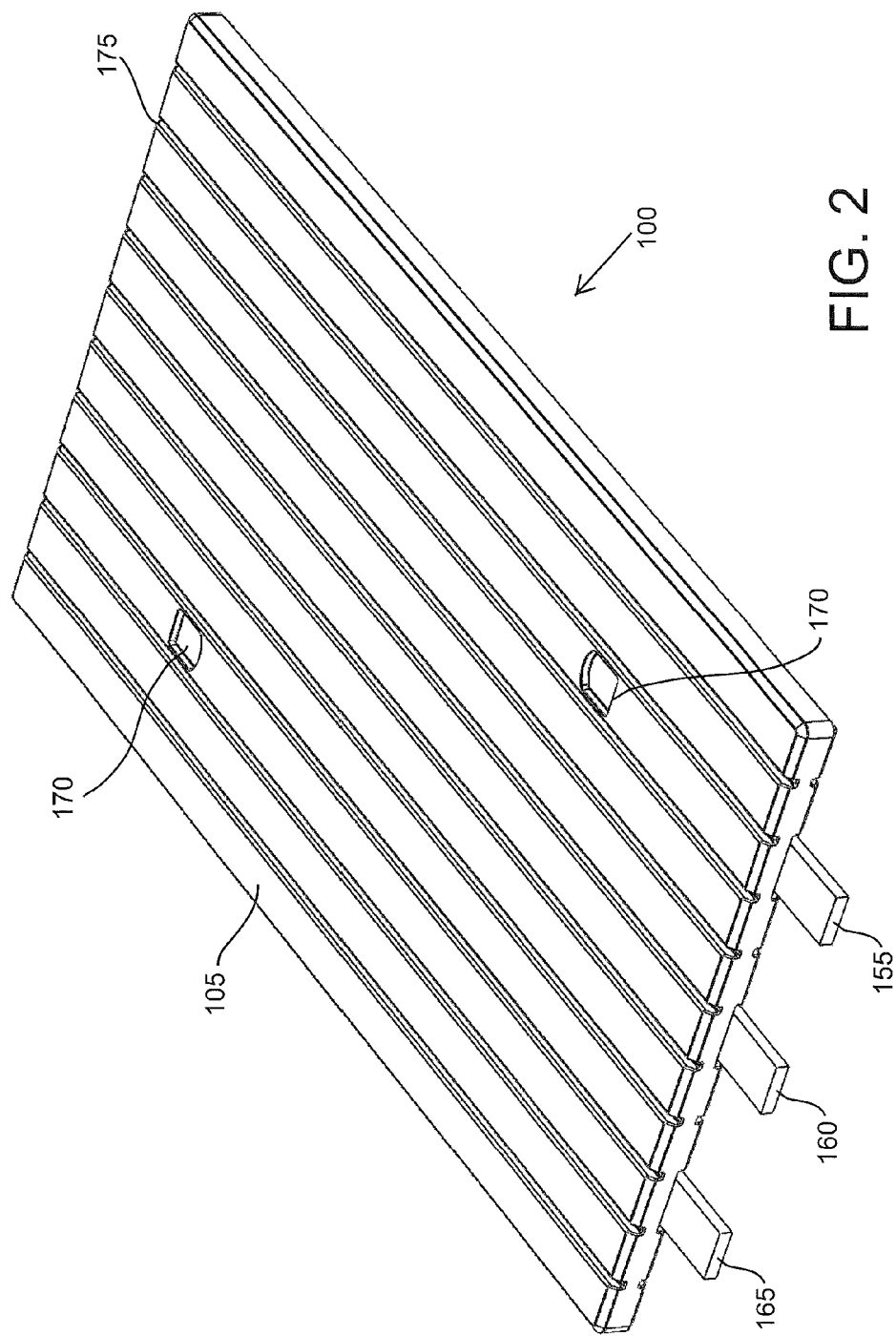
FIG. 2 is a top perspective view of the mat of FIG. 1 as prepared for use.
Figure 3:
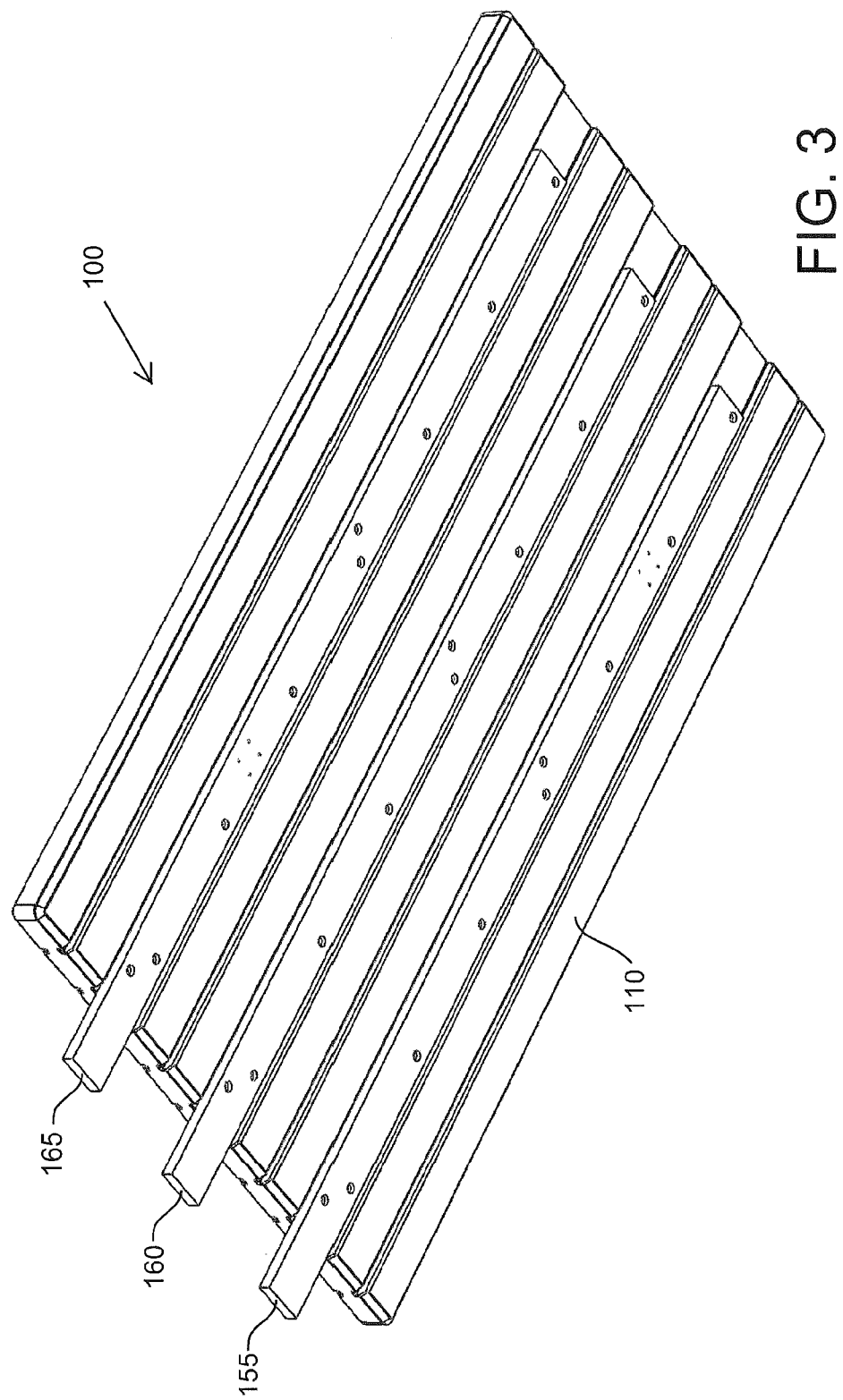
FIG. 3 is a bottom perspective view of the mat of FIG. 1 as prepared for use.

FIGS. 2 and 3 illustrate the final shape and configuration of the mat 100 after assembly. The encapsulation covers the entire mat with the exception of the three interlocking boards 155, 160 165 on the bottom surface that are added after the core construction is encapsulated.

Figure 4:
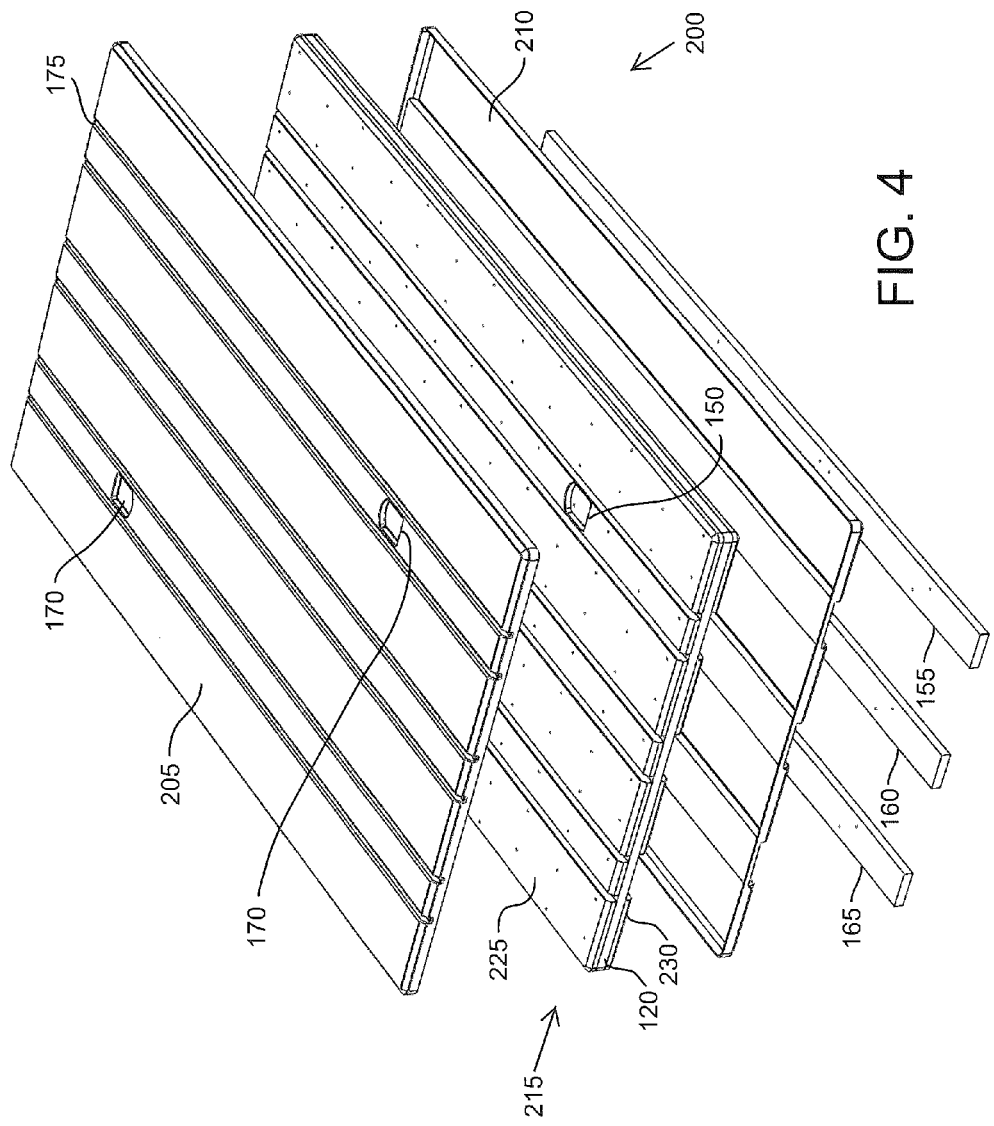
FIG. 4 is an exploded view of a mat according to the invention showing the use of double width boards for the core construction including the central, upper and lower layers, with the encapsulation artificially separated into upper and lower portions to illustrate its position about the core construction.

FIG. 4 illustrates a second mat 200 according to the invention that uses three layers of wood for the core construction. In this mat, double width boards 225, 230 are used in place of the single width boards 125, 130 of FIG. 1. As in FIG. 1, the skin is shown in two artificial sections, namely an upper skin 205 and lower skin 210 which are used to surround and encapsulate core construction 215. As in the embodiment for FIG. 1, space is provided for the boards 155, 160, 165 on the lower portion 210 of the encapsulation that provide interlocking and openings 170 are provided for attachment of lifting elements. Openings 150 may also be provided on the boards of the core construction 215 beneath openings 170 of the encapsulation so that the lifting elements can be directly attached to the core construction 215. As a number of the same components are used, the same numerals used in FIGS. 1-3 are used to designate the same components for the mat of FIGS. 4-6.

Figure 5:
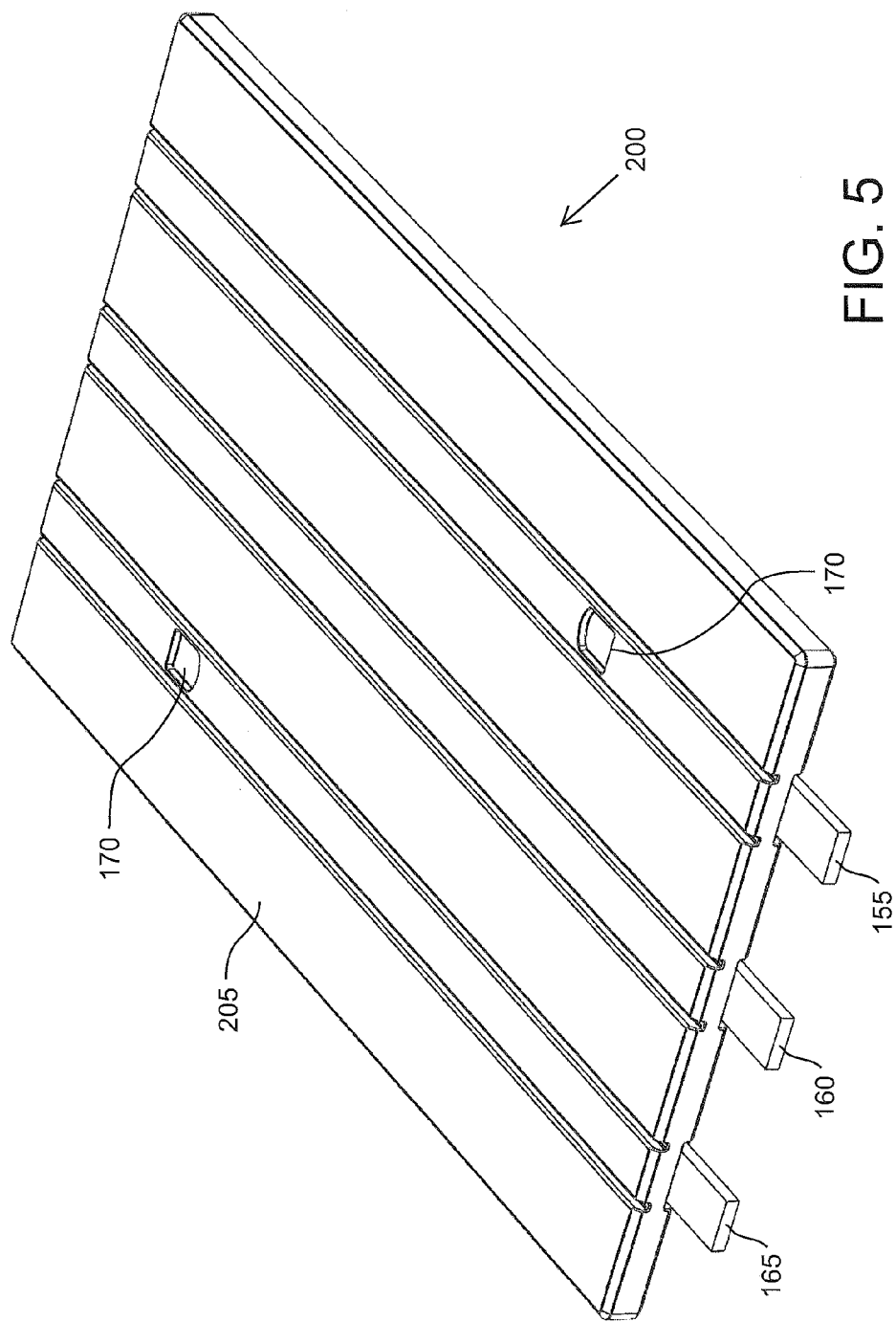
FIG. 5 is a top perspective view of the mat of FIG. 4 as prepared for use.
Figure 6:
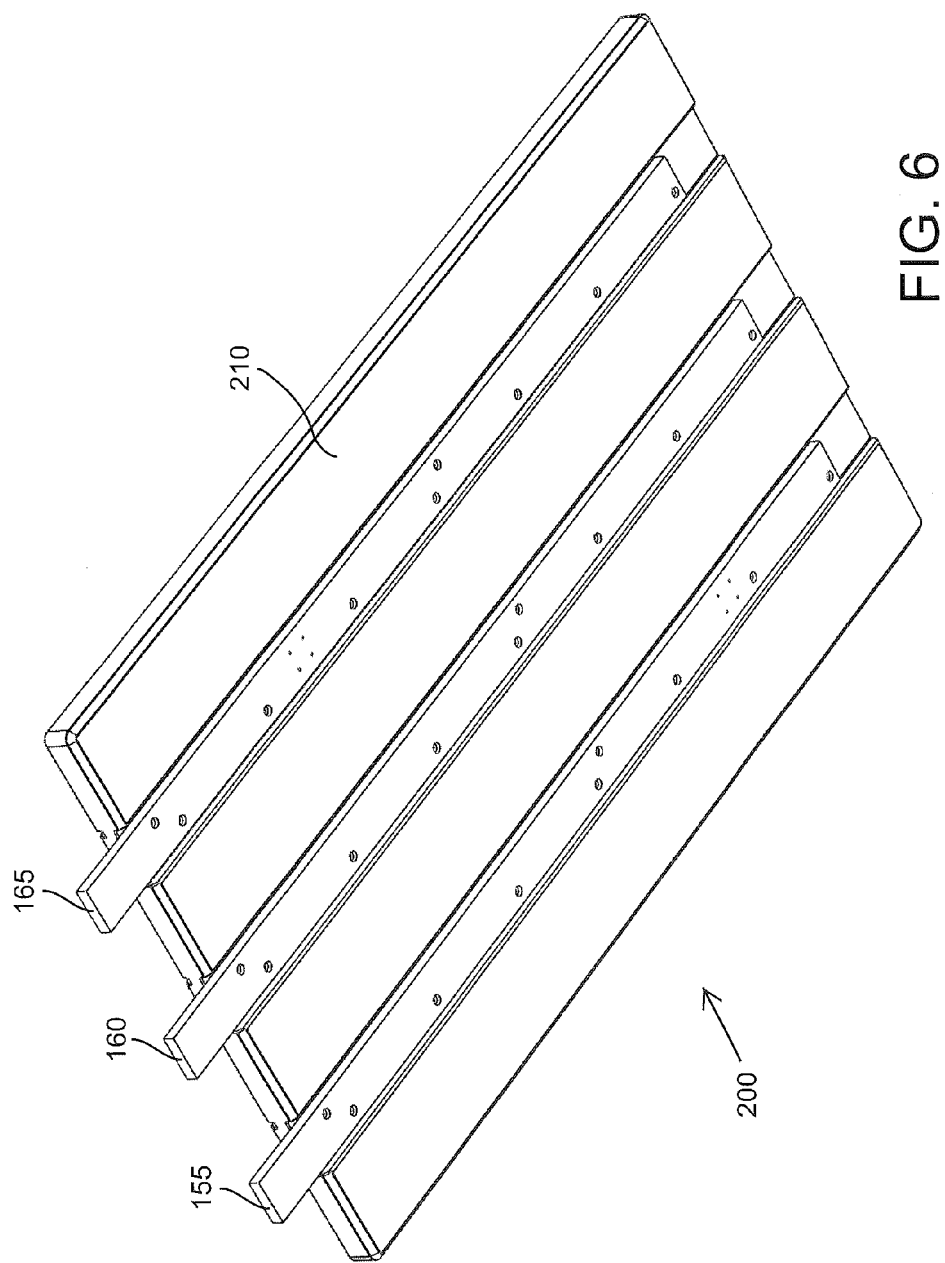
FIG. 6 is a bottom perspective view of the mat of FIG. 4 as prepared for use.

FIGS. 5-6 illustrate the final mat 200 after assembly.

The drainage channels 175 provide an advantage for mat 100 compared to mat 200 when the mats are to be used in an environment that will experience rainy or snowy weather conditions. These channels are provided by including projections or protruding segments on the mold. For application of the mats in a dry environment, mat 200 is preferred because it is easier to manufacture.

And while offsetting of certain boards is shown for providing an interlocking with adjacent mats, this is not always needed such that interlocking can be considered to be an optional yet desirable feature. Interlocking is often preferred to avoid staking of the mats to the ground or to avoid including other more complex components for use in connecting adjacent mats together. The interlocking boards are provided on at least the lower surface of the mat, but in certain embodiments, they can be provided on both the lower and upper surfaces of the mat as shown in the figures. And interlocking boards can be entirely omitted if desired, with the core construction including boards in all spaces prior to being encapsulated.

Figure 7:
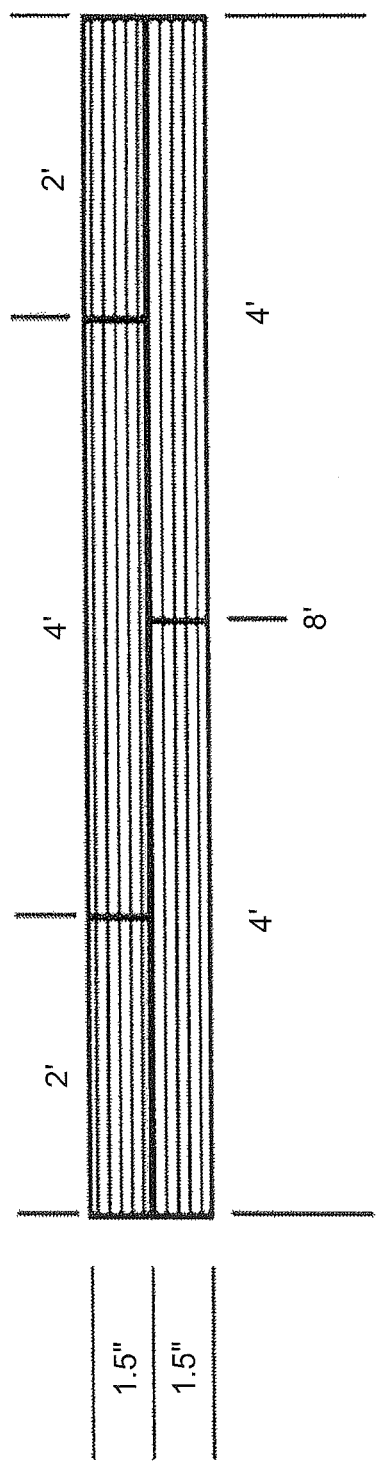
FIG. 7 is a schematic illustration of an engineered wood configuration for use as the core construction.

When engineered lumber is used, there are a number of configurations which are ideally suited for use of that material as the core construction of the present invention. In particular, LVL is used for these embodiments. A preferred embodiment is shown in FIG. 7, wherein the structure of the core construction is a 3 inch thick, 4 foot wide by 8 foot long block that is made by multiple strips of unidirectional veneers that are adhered together to form the block. First of all, two base blocks that are 1.5 inches thick and are 4 foot wide by 4 foot long are prepared. These blocks are joined together along their width to form a 4 foot by 8 foot by 1.5 inch thick combined block structure. This combined block structure is reinforced by adding two 1.5 inch thick, 4 foot wide by 2 foot long sections on the upper surface of the combined block structure: one at the forward end of the mat and one at the rear end of the mat. Between these sections is a middle section that is 1.5 inch thick, 4 foot wide and 4 foot long located between the forward and rear sections.

For greatest strength in any of these embodiments, most unidirectional veneers are oriented in the machine direction with 5 to 30% and preferably 20 to 25% of the veneers oriented in the cross machine direction. That geometry sets up some very impressive physicals for the combined structures.

The structure shown in FIG. 7 is a "single board" that would require no fastening mechanisms and that can be just dropped onto the bed of rubber crumbs in the mold. Furthermore, the costs of the structures of these embodiments will be on the order of oak or other hardwoods.

Preferred overall mat dimensions for wood mats are approximately 8' wide×6" tall and are either 12 ft, 14 ft or 16 ft in length. The interlocking feature will extend the length of the mats by about 1 ft at three locations at one end of mat. U.S. Pat. No. 4,462,712 discloses mats which contain interlocking fingers and recesses which are preferred for use in the present invention.

The mats typically include three (3) layers of individual wood or engineered wood boards having cross section dimensions of 1.75" by 8".

The spacing between individual boards or components in the upper layer is preferably approximately 1.25" to allow water to drain from the mat. This spacing is retained in the encapsulating skin. The slip resistance of the mat is improved by the draining of the excess water, especially when use in locations that experience heavy rain or snow conditions.

The preferred mats have physical properties that meet or exceed the physical properties of a conventional white oak mat. Any of the engineered wood products can also be used.

The mat must also provide sufficient load bearing capacity: a fully supported mat (one that is properly installed on an approved ground surface preparation) must withstand a 10 ton load, spread over a 12" diameter surface without degradation of mat properties or permanent deformation of core construction of the mat. The core would have a crush resistance of between about 600 and 800 psi depending upon the application. This provides resistance against compression while not detracting from providing resistance to torsion forces that applied to the mat by vehicles passing thereover.

Preferably, the skin is relatively nonflammable. Flammability of mat is defined as Class 2 (B) flame spread when measured by ASTM E84 test criteria. The flammability properties of the skin materials can be reduced by adding the appropriate conventional flame retardant or other additives that are known to impart such properties.

The skin should also allow dissipation of static electricity. For this purpose, the skin may include carbon black, metal particles or other conductive fillers.

To prevent premature deterioration of the skin, the polyurethane matrix should contain UV inhibitors as necessary and in an amount sufficient to reduce deterioration of physical properties or color.

The core construction of the mat preferably is not hollow. If hollow components are used for the various layers of the core construction, such as metal lath, metal sheets with openings provided therein, thermoplastic or fiberglass reinforced thermosetting plastic pultrusions or structures that have openings therein, the openings may be preferably filled with a non-absorbent material. A wide variety of different plastic, elastomeric or foam materials can be used for this purpose. The hollow portions can be used as is or can be provided with filler or other materials to increase or decrease weight as needed. Fillers of glass, ceramic or metal particles can be included to provide additional weight or strength to the mat. Other materials such as crumb rubber or other environmentally friendly materials can instead be used. Preferably, the mat has a weight that is on the order of a white oak mat of similar size.

For a more advanced product, the core construction layer may be made of environmentally resistant material to further prevent against degradation due to weather conditions in the event that the skin becomes damaged or otherwise compromised to allow liquid to enter into the core construction. These materials would include the thermosetting materials disclosed herein as well as metals such as steel, aluminum or stainless steel.

While steel does rust when encountering moisture or water, this is not considered to be a deterioration of the material as it is a surface phenomenon that does not affect the physical properties of the material but instead just detracts from its surface appearance. To avoid this, the steel components can be coated or painted to provide a better appearance and even further environmental resistance. Under certain conditions treated wood can withstand rotting and degradation much better than untreated wood such that it would be considered to be an environmentally resistant material because of its improved resistance against rotting.

Figure 8:
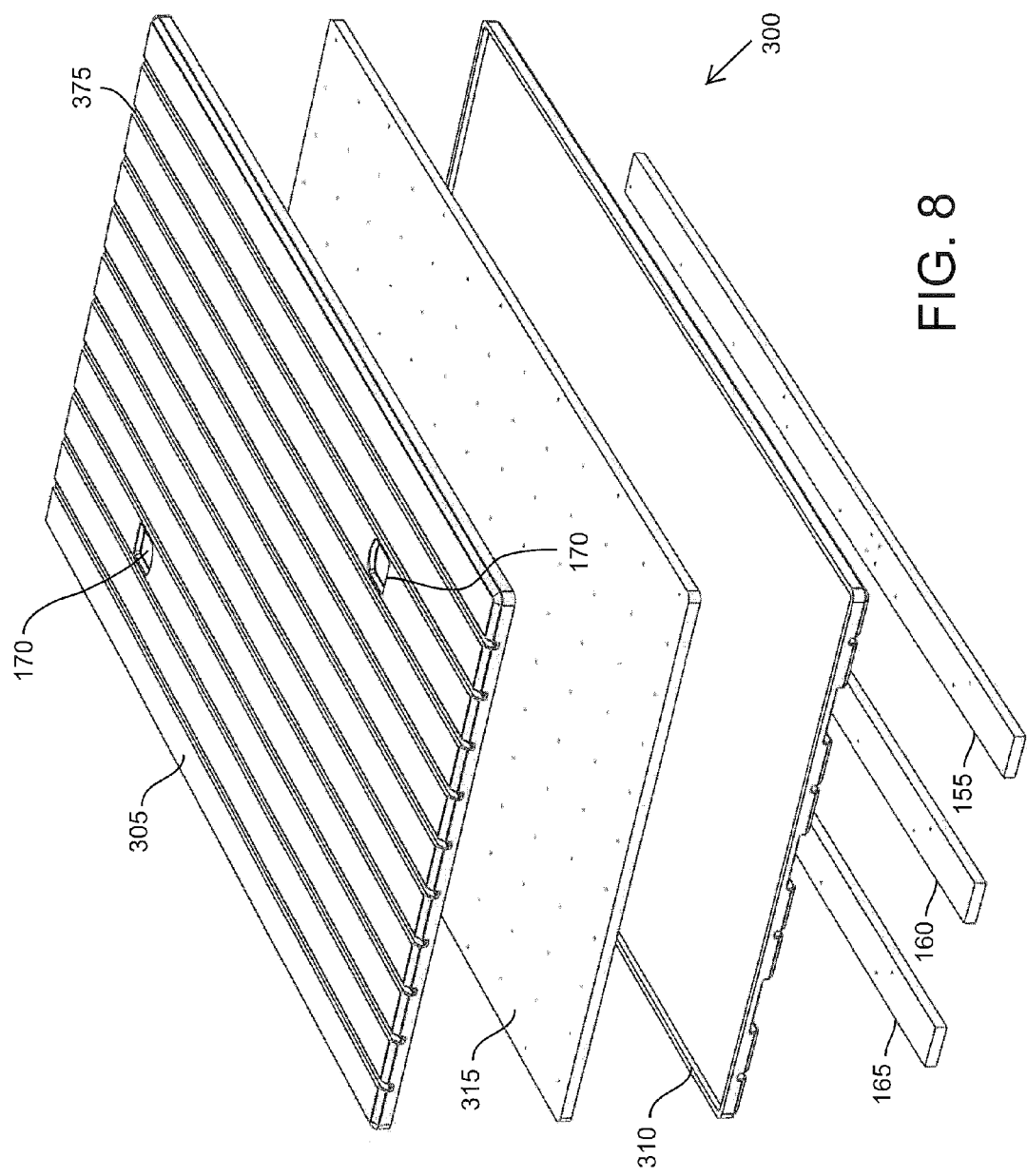
FIG. 8 is an exploded view of a mat that utilizes a flat core construction, with the encapsulation artificially separated into upper and lower portions to illustrate its position about the core construction.

FIG. 8 illustrates these additional embodiments of the invention. As in FIGS. 1 and 4, the encapsulating skin for the mat 300 is shown in two artificial sections, namely an upper skin 305 and lower skin 310 which are used to surround and encapsulate core construction 315. For this embodiment the core construction 315 is shown as a plate or sheet. The material for this plate or sheet can be anyone of those mentioned herein including engineered wood, steel or other metals, or a reinforced thermosetting resin (e.g., reinforced with glass or other known material to provide increased strength). The sheet or plate has sufficient properties to provide strength and rigidity to the mat. The sheet or plate may include positioning pins or cones so that it would be properly placed in the mold after the mold is provided with the rubber crumb particles. As in the embodiments for FIGS. 1-6, space is provided for the boards 155, 160, 165 on the lower portion 210 of the encapsulation that provide interlocking and openings 170 are provided for attachment of lifting elements.

The upper and lower surfaces of the mold would be provided with protrusions that impart drain channels 375 into the top and bottom surfaces of the encapsulation. Unlike the mats of the other embodiments, the upper and lower surfaces are actually made of elongated strips of cured polyurethane matrix/rubber crumb rather than a coating over the boards or elongated members for the core construction. These strips, which are in reality formed when the resin is introduced into the rubber crumb particles, can be as thick as 2 to 4 inches on each of the top and bottom services and of the same length as the elongated members of an upper or lower ply of a three ply wood mat. These strips of course require much more rubber crumb than in the other embodiments where the encapsulation is in effect a coating over a three layer mat.

Instead of linear drain channels 175 as shown, the mat surfaces can be prepared with different configurations that provide recessed areas for drainage of water for better traction of vehicles or personnel that move upon the mats. These drain channels can be linear in parallel arrangement as shown or additional drain channels can be provided at 90 degree or other angles to the parallel channels. As the core construction is flat, the raised crumb rubber portions can be provided as segmented shapes of other than rectangles, such as triangles or other polygons. The shapes can take the form of raised or recessed letters, numbers, writing or other combinations of alphanumeric characters. Alternatively, the surface can be provided with grit, particles or other granular material that would provide a more slip resistant surface. All of these provide better traction when personnel or equipment are moving upon the mat.

All of the mats according to the invention are to be installed on a prepared ground surface so that they will perform acceptably. Ground preparation is typically upon a material of uniform flatness (e.g., within +/−12" over, e.g., an 8'×14' surface). Crushed stone or rock generally no larger than 4" diameter is acceptable for preparing the ground as a substrate for supporting these mats.

All mats according to the invention that include the most preferred core constructions or alternatives thereof are designed to meet the product specifications described herein for preferred implementations as temporary roadways, equipment support surfaces, platforms and similar applications. A further benefit of the mats of the invention is that they do not cause contamination of the ground surfaces upon which they are applied.

For ease in moving of the mats, attachment points can be provided that allow for lifting and handling of individual mats. Lifting hardware preferably includes D rings, O-rings, chain, or cables at 2-4 locations on the upper surface of the mat. The exact position and attachment of lifting hardware is designed based on the size and weight of the mat and is intended to avoid damage to the encapsulating skins or the internal support structure of the mat.

A number of additional features may be provided in the mats of the present invention. A radio frequency identification (RFID) tag can be embedded into the access mats in a routered pocket in the core construction to enable the access mats to be monitored in an inventory system or when rented for use. The tag provides a unique identification serial number for each mat, such that the mats which are being used or rented can be tracked and accounted for as to location of use. The mats can be scanned when in a warehouse, when loaded on trucks for delivery, when delivered to a job site, or when collected from a jobsite after use. The RFID tags can be active or passive and if desired, other tracking devices such as barcodes could similarly be for the same purposes. It is preferred, however, that the RFID tag be embedded in the mat so that it is protected from damage by the skin that encapsulates the mat. When a barcode or other surface mounted tag or indicia is used, it should be placed on a surface portion of the mat that is less likely to experience wear or abuse. Thus, the tag may preferably be applied onto the side of the mat so that it is not directed exposed to traffic on the mat.

In order to manipulate the mats for loading/unloading, or moving from one location to another or for installation and retrieval, the mats can include a retractable lifting element. This can be the lifting elements described above and those elements lie in a recess in the top surface of the mat during use for ease of access and to prevent tripping or damage to items moving over the mat or damage to the lifting elements themselves. Alternatively, a more complicated design such as that of US patent publication 2008/0292397 can be used.

To assist in the use of the mat during the night or on days that are dark due to poor weather conditions, the mat may include one or more lighting elements, such as those disclosed in International application WO 2006/048654. These lighting elements would preferably be embedded in an opening or recess in the skin. The lighting elements can be protected by a coating or separate encapsulation of a clear plastic material, so that the lighting element may be positioned below the skin for better protection of the lighting element during use. As the embedding of the lighting element below the skin surface can result in reduced luminosity, a skilled artisan can best determine the appropriate location for the placement of the lighting element in or under the skin and for providing the skin of the appropriate color or clarity to achieve the desired lighting brightness. This can also be adjusted by providing a larger number of lighting elements or of lighting elements of larger size.

Another feature of the invention is the use of color coding to identify the core construction of the mat. As the encapsulation is opaque, it is not possible to visually determine how the core is made. Thus, a color coding system can be used to identify the specific core construction. This can also be used to identify mats for a particular customer or end user. When mats are rented or leased, the color coding can be used to identify which mats belong to the leasing company compared to mats provided by others. The color coding can be of a single color or of certain stripes, patterns, dots or other indicia that provides a "signature" that identifies the specific core that is present in the mat or a particular end user or owner of the mat.

The present invention provides unexpected benefits over the art in that the skin provides resistance to abrasion and abuse of the core construction while also preventing moisture, water or chemicals from the surrounding environment from penetrating into the core construction. Additionally, the mats have anti-static properties and provide traction and anti-skid surfaces depending upon the finish of the skin or coating surfaces that are exposed. These can be provided with particulate matter of any type of inorganic particles or plastic or rubber pellets to provide an anti-skid surface. The amount of particles would depend upon the size and can be determined by routine testing depending upon the material use for the skin or coating. Also, certain materials such as rubber, when present as or in the skin, act as a heat sink to allow ice to melt more quickly from the mat which is a safety feature when the mats experience snow and ice conditions in winter. The mats can also be pigmented to be place to assist in absorbing sunlight to melt ice or snow.

All of these features contribute to the ability of the mat to provide a much longer service life compared to when wood components are used alone since the skin prevents rotting or other chemical degradation of the wood components of the core construction. Further enhancements in service life can be expected by providing a core construction made of thermosetting or thermoplastic materials or plastic coated metal.

What is claimed is:

1. An industrial mat comprising:
a core construction that provides strength and rigidity to the mat, the core construction comprising a support structure that includes one or more elongated components or a plurality of elongated members of wood, engineered wood, a thermosetting plastic material or a metal; and an encapsulation of a durable skin comprising crumb rubber particles embedded in a polyurethane matrix that surrounds and encapsulates the entire core construction, with the skin having a thickness sufficient to provide environmental resistance to the core construction to which it is applied while also providing abrasion resistance to the mat;

wherein the core construction comprises at least two layers or plies that are joined together by nails, rivets, screws, bolts, welding, or brazing, with the layers or plies contacting each other, wherein each layer or ply has a length and width that substantially corresponds to that of the core construction, and wherein:

(a) one of the layers or plies comprises thermoplastic material in the form of a plurality of adjacently arranged elongated members or a sheet member, with the sheet member including apertures or openings therein, and another layer or ply comprises a plurality of adjacently arranged elongated members or a sheet member of wood or engineered wood; or (b) one of the layers or plies comprises one or more elongated components or members of metal and another layer or ply comprises a plurality of adjacently arranged elongated members or a sheet member of wood or engineering wood; or (c) one of the layers or plies comprises a reinforced thermosetting plastic support structure in the form of a plate, grid, grating, ladder or pultruded tubes and another layer or ply comprises a plurality of adjacently arranged elongated members or a sheet member of wood or engineered wood.

2. The mat of claim 1 wherein the durable skin has a thickness of at least about 0.5 inches and wherein the components or members of each layer or ply of the core construction have a thickness of not less than about 0.75 inches and not more than about 12 inches.

3. The mat of claim 1 wherein the core construction comprises a first layer that includes a sheet member of a thermoplastic material, and a second layer that includes a plurality of adjacently arranged elongated members of wood or engineered wood.

4. The mat of claim 1 wherein the core construction comprises two or three layers that each include adjacently arranged elongated components of wood or engineered wood with the layers bolted together before being encapsulated.

5. The mat of claim 4 wherein the core construction includes central, upper and lower layers each comprising a plurality of wood or engineered wood boards having a modulus of at least about 1.6 M psi, wherein the mat has a thickness of 6 to 12 inches.

6. The mat of claim 1 wherein the core construction is made of materials that provide a load bearing capacity that is able to withstand a load of at least 600 to 800 psi or more without permanently deforming the core construction, and wherein the mat has a thickness of 6 to 12 inches.

7. The mat of claim 1 wherein the encapsulation has a thickness of between about 0.25 and 2 inches.

8. The mat of claim 7, wherein the skin comprises 55 to 80% by weight of crumb rubber and 20 to 45% by weight of polyurethane.

9. The mat of claim 1 wherein the core construction includes a central layer, an upper layer positioned above the central layer or a lower layer positioned below the central layer or both upper and lower layers, wherein each layer includes a plurality of adjacently arranged elongated members of wood or engineered wood, each having a modulus of at least about 1.6 M psi, and wherein the core construction is made of materials that provide a load bearing capacity that is able to withstand a load of at least 600 to 800 psi or more without permanently deforming the core construction.

10. The mat of claim 1 wherein the core construction includes engineered wood made of adhered veneers, with the core construction comprising a first layer of one or more base blocks having a thickness of between about 1 and 3 inches, a width of between about 4 and 6 feet and a length of between about 12 and 16 feet and a second layer of a plurality of reinforcement sections having a thickness of between 1 and 3 inches and a width that is the same as that of the base blocks.

11. The mat of claim 10, wherein most of the veneers are oriented in a machine direction and between 5 and 30% of the veneers are oriented in the cross machine direction.

12. An industrial mat comprising:
a core construction that provides strength and rigidity to the mat, the core construction comprising a first layer of a reinforced thermosetting plastic support structure in the form of a plate, grid, grating, ladder or pultruded tubes, and a second layer that includes adjacently arranged elongated components of wood or engineered wood, with the layers bolted together before being encapsulated; and an encapsulation of a durable skin comprising crumb rubber particles embedded in a polyurethane matrix that surrounds and encapsulates the entire core construction, with the skin having a thickness sufficient to provide environmental resistance to the core construction to which it is applied while also providing abrasion resistance to the mat.

13. The mat of claim 12, wherein the durable skin has a thickness of at least about 0.5 inches and the first layer of the core construction comprises a fiberglass reinforced thermosetting plastic grating having apertures or openings therein that receive and are filled by the polyurethane matrix and crumb rubber particles.

14. The mat of claim 13, wherein the core construction further comprises a further layer that includes a plurality of adjacently arranged elongated members of wood or engineered wood, with the grating located between the wood layers and with all layers nailed, screwed or bolted together before being encapsulated.

15. The mat of claim 12, wherein the first layer is a reinforced thermosetting plastic support structure in the form of pultruded tubes.

16. The mat of claim 15, wherein the core construction further comprises a further layer that includes a plurality of adjacently arranged elongated members of wood or engineered wood, with the layer of pultruded tubes located between the wood layers and with all layers nailed, screwed or bolted together before being encapsulated.

17. An industrial mat comprising:
a core construction that provides strength and rigidity to the mat, the core construction comprising one layer of a metal sheet and another layer that includes a plurality of adjacently arranged elongated members or a sheet member of wood or engineered wood with the layers bolted together before being encapsulated; and an encapsulation of a durable skin comprising crumb rubber particles embedded in a polyurethane matrix that surrounds and encapsulates the entire core construction, with the skin having a thickness sufficient to provide environmental resistance to the core construction to which it is applied while also providing abrasion resistance to the mat.

18. The mat of claim 17, wherein the core construction further comprises a further layer that includes a plurality of adjacently arranged elongated members of wood or engineered wood, with the metal sheet located between the wood layers and with all layers nailed, screwed or bolted together before being encapsulated.

19. An industrial mat comprising:
a core construction that provides strength and rigidity to the mat, the core construction comprising a first layer that includes a sheet member of a thermoplastic material, and a second layer that includes a plurality of adjacently arranged elongated members of wood or engineered wood, with the sheet member including apertures or openings therein; and
an encapsulation of a durable skin comprising crumb rubber particles embedded in a polyurethane matrix that surrounds and encapsulates the entire core construction, with the skin having a thickness sufficient to provide environmental resistance to the core construction to which it is applied while also providing abrasion resistance to the mat;
wherein the durable skin has a thickness of at least about 0.5 inches and the polyurethane matrix and crumb rubber particles fill the apertures or openings of the sheet member of thermoplastic material.

20. The mat of claim 19, wherein the core construction further comprises a further layer that includes a plurality of adjacently arranged elongated members of wood or engineered wood, with the sheet member of thermoplastic material located between the wood layers and with all layers nailed, screwed or bolted together before being encapsulated.

* * * * *

UNITED STATES PATENT AND TRADEMARK OFFICE
CERTIFICATE OF CORRECTION

PATENT NO. : 9,486,976 B1  
APPLICATION NO. : 14/855336  
DATED : November 8, 2016  
INVENTOR(S) : Penland, Jr. et al.

Page 1 of 1

It is certified that error appears in the above-identified patent and that said Letters Patent is hereby corrected as shown below:

In the Claims

Column 19:
Line 28, after "wood or" delete "engineering" and insert -- engineered --.

Signed and Sealed this
Third Day of January, 2017

Michelle K. Lee
*Director of the United States Patent and Trademark Office*